United States Patent [19]
Criswell

[11] 3,753,550

[45] Aug. 21, 1973

[54] FRAME ATTACHMENT FOR REMOTELY POSITIONED JACKS

[75] Inventor: Richard L. Criswell, Leisure City, Fla.

[73] Assignee: Afton Eloff, Jr., Toledo, Ohio

[22] Filed: Dec. 27, 1971

[21] Appl. No.: 212,392

[52] U.S. Cl. .............................................. 254/133
[51] Int. Cl. ............................................ B66f 13/00
[58] Field of Search .................... 254/133, 134, 131, 254/45

[56] References Cited
UNITED STATES PATENTS
| | | | |
|---|---|---|---|
| 2,650,055 | 8/1953 | Perkins | 254/133 R |
| 2,882,012 | 4/1959 | Luna | 254/133 R |

FOREIGN PATENTS OR APPLICATIONS
| | | | |
|---|---|---|---|
| 538,235 | 3/1957 | Canada | 254/45 |

Primary Examiner—Othell M. Simpson
Assistant Examiner—Robert C. Watson
Attorney—Williem P. Hickey

[57] ABSTRACT

An attachment for connecting remotely positioned jacks to the frame of a land vehicle having an inwardly turned bottom flange. The attachment generally comprises: a C-shaped hook on one end of an arm for confining an inwardly turned bottom flange of the vehicle's frame, a downwardly turned jack retaining lip at the opposite end of the arm, an abutment for engaging the outer surface of the frame, and a stiffening web between the abutment and the jack retaining lip.

3 Claims, 4 Drawing Figures

Patented Aug. 21, 1973 3,753,550

FRAME ATTACHMENT FOR REMOTELY POSITIONED JACKS

BACKGROUND OF THE INVENTION

The structural frames of land vehicles generally comprise longitudinally extending members having inwardly turned top and bottom flanges, which members are usually channel members. The ground engaging wheels of the vehicle are supported on an axle which in turn is secured to the frame members. When it is desired to change a wheel or tire of the vehicle, it is necessary to place a jack under the axle, or frame, and raise the wheel out of ground engagement. The vehicles with which we are concerned all have either bodies, or the load being carried by the vehicle positioned over and extending laterally outwardly of the frame. A post or tripod type jack must extend upwardly past the structure being raised and therefore cannot be secured to the channel frame members. In the past, these posts or tripod type jacks have been used almost exclusively for raising those types of vehicles which are equipped with bumpers that project outwardly from the frame of the vehicle.

In order to raise those types of vehicles which are not equipped with bumpers, it has been necessary to kneel down on the ground and slide a scissors-type jack or a short hydraulic jack under the axle or frame of the vehicle, and actuate this jack by means of a long extension of the jack's actuating mechanism. This operation is not only awkward, but invariably dirties the clothes of the operator.

An object of the present invention is the provision of new and improved means for raising vehicles that are not equipped with bumpers in a manner which does not require the operator to either kneel on the ground to install the jack, or to actuate the jack in a crouched position.

Another object of the invention is the provision of a new and improved attachment for the frame of a vehicle which securely attaches to the frame and projects outwardly to receive the elevating elements of a post or tripod type jack of the type customarily used on vehicle bumpers.

A further object of the invention is the provision of a new and improved frame attachment of the above described type that is simple in design, rugged in construction, and inexpensive to manufacture.

Further objects and advantages of the invention will become apparent to those skilled in the art to which it relates from the following description, described with reference to the accompanying drawings.

DESCRIPTION OF THE PREFERRED EMBODIMENTS

Figure 1:
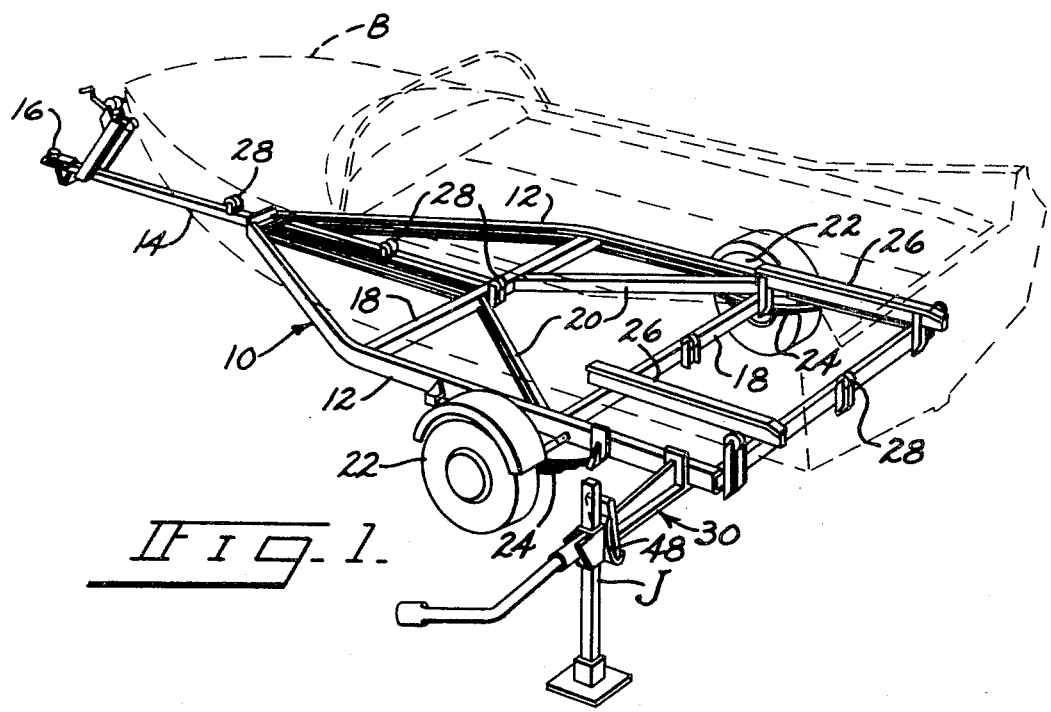
FIG. 1 is an isometric view of a boat trailer being raised by a jack and frame attachment of the present invention, and which trailer is carrying a boat depicted by dashed lines.
Figures 2, 4:
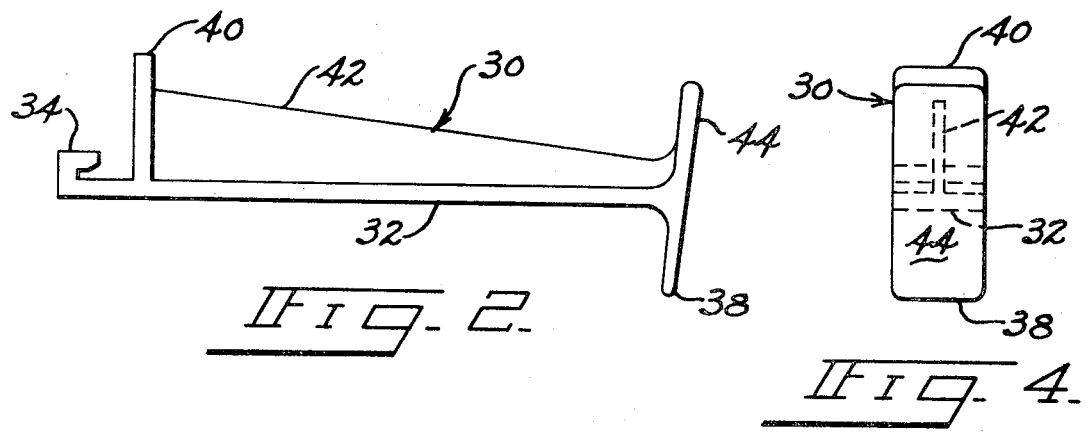
FIG. 2 is an elevational view of the frame attachment shown in FIG. 1.
FIG. 4 is an end view of the frame attachment shown in FIGS. 2 and 3.
Figure 3:
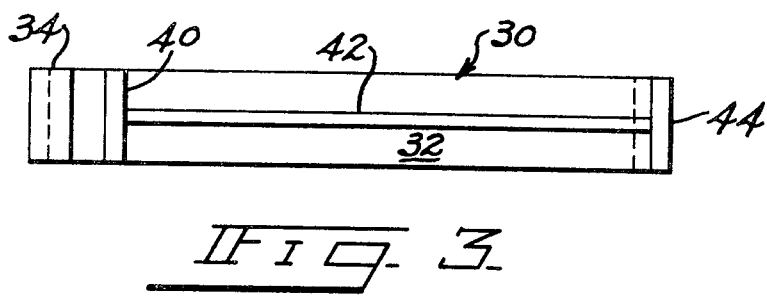
FIG. 3 is a plan view of the frame attachment shown in FIG. 2.

While the method and apparatus of the present invention can be used with substantially any vehicle having a frame member with an inwardly extending lower flange, it is herein shown and described with reference to the raising of a boat trailer. The trailer frame 10 generally comprises a pair of channels 12, the front ends of which are secured to a tongue 14 which carries the usual socket 16 for receiving a ball hitch of a towing vehicle, not shown. The trailer frame 10 also includes cross channels 18, and diagonal braces 20 which tie the center of the front cross channel 18 to the channels 12. The frame is supported by a pair of wheels 22 which are mounted on the opposite ends of an axle not shown, and the frame 10 is supported from the axle by a pair of springs 24. The boat B shown by dashed lines is supported by a pair of bolsters 26 that are fastened between the rear and intermediate cross channels 18, as well as by a plurality of rubber rollers 28 which support the keel of the boat. The boat B is wider than the spacing of the channels 12 and projects laterally thereof by approximately 1 foot. It will further be seen that the boat extends rearwardly of the rear cross channel 18, so that all of the frame of the trailer excepting the front portion of the tongue is covered by the boat.

According to the invention, a vehicle structure overlying its frame is elevated or raised by an upright type jack that is positioned outwardly of the structure covering the frame. Force from the remotely positioned jack J is transferred to the channel 12 by means of a frame attachment 30. The frame attachment 30 comprises a bottom flange 32 one end of which extends under the channel 12 and carries a C-shaped clip portion 34 for gripping the inner end of the bottom flange of the channel 12. The other end of the bottom flange 32 of the frame attachment 30 has a downwardly turned lip 38 for receiving and retaining the lifting element of the jack J. The lip 38 will prevent the lifting element from slipping outwardly of the outer end of the frame attachment 30. The frame attachment 30 also includes a vertical abutment 40 for engaging the outer surface of the channel 12 and preventing rotation of the frame attachment beyond a generally horizontal position. The frame attachment 30 preferably also includes a stiffening web 42 which extends between the abutment 40 and the downwardly turned lip 38 to resist the moment produced by the jack J.

In the preferred embodiment, the downwardly turned lip 38 is part of a transverse plate 44, that also extends above the bottom flange 32. Preferably the plate 44 is inclined outwardly, so that the upper end of the transverse plate forms an angle of greater than 90° with the flange. The outer face of the transverse plate 44, therefore, has an angle of inclination generally similar to that of the lower end of automotive bumpers, so that a bumper jack can engage the lip 38 and the outer inclined surface of the plate 44, and thereby support a J-type bumper attachment of a post type bumper jack at approximately the same angle as occurs when the jack is used upon an automotive bumper. The angle of inclination of the plate 44, therefore, prevents the bumper attachment from slipping off of the lip 38. It will also be seen that a hydraulic jack or scissors jack can be located below the outer end of the flange 32 and that the bottom lip 38 of the plate 44 will prevent the jack from slipping outwardly off of the frame attachment 30.

The frame attachment 30 is used by holding the attachment at an upwardly inclined angle to hook the C-shaped clip 34 over the bottom inwardly projecting flange of the vehicle frame. The inner upper edge of the C-shaped clip is beveled at approximately 30° to allow the flange to slip into the groove when the C-shaped clip 34 is supported at an inclined angle of approximately 30°. Once the flange has slipped into the groove, the heel or bottom external corner of the channel will be inwardly of the abutment 40, so that the attachment 30 can be rotated to a horizontal position wherein the bottom flange 32 engages the bottom flange of the channel while the outer surfaces of the channel engage the inner upright surface of the abutment 40. The attachment is thereafter locked in place against further upward motion of the outer end of the frame attachment 30. When a bumper jack is used, its J-shaped bumper clip 48 is hooked under the lower lip 38 while its vertical inside surface is positioned against the outer surface of the transverse plate 44. The pivot pin for the J-shaped clip 48 is received within the elevating portion of the bumper jack and up-and-down movement of the jack handle raises the actuating element and J clip 48 to lift the outer end of the frame attachment 30. As previously stated, the frame attachment is locked against rotation by its abutment with the outer face of the frame of the vehicle, and therefore the frame is raised along with the actuating element of the jack.

It will be seen that the frame attachment 30 can be hooked in place upon the channel frame of the vehicle without kneeling on the ground and thereafter it swings to a position for receiving the bumper jack, in which position the bumper jack is at such an elevation that its actuating handle can be actuated from a standing position. In those instances where the type of jack being used does not include a J clip 48, the outer end of the frame attachment 30 need only include the downwardly turned lip 38 and need not include the portion of the plate 44 extending above the flange 32. This, however, is not the preferred configuration. It will now be seen that the frame attachment can be made in one piece as by a casting, and is simple and rugged in its design, and inexpensive to manufacture.

While the invention has been described in considerable detail, I do not wish to be limited to the particular embodiments shown and described, and it is my intention to cover hereby all novel adaptations, modifications, and arrangements thereof which come within the practice of those skilled in the art to which the invention relates.

I claim:

1. A frame attachment for raising vehicles having a frame member with an inwardly turned flange adjacent its lower surface, said attachment comprising: a bottom flange section of generally rectangular cross section having a C-shaped section at one end for receiving a bottom inwardly turned flange of a vehicle frame, a first abutment section spaced from said C-shaped section and projecting generally perpendicularly upwardly of said flange section of said attachment for engaging the outside surface of the vehicle frame, a second upwardly extending abutment at the opposite end of said bottom flange section of said attachment from said C-shaped section, a stiffening web extending between said abutments, and jack engaging means for applying lifting force to said opposite end of said attachment and for preventing separation of said jack from said attachment.

2. The frame attachment of claim 1 wherein said jack engaging means includes a downwardly extending projection adjacent the outer end of said bottom flange of said attachment to receive the rounded bottom portion of a generally J-Shaped jack clip, and said second abutment extends upwardly thereof from said projection and is of sufficient size and strength to engage the upstanding leg of a generally J-shaped jack clip and resist the turning moment of said J-shaped jack clip about said downwardly extending projection of said frame attachment.

3. The frame attachment of claim 2 wherein said second abutment forms an angle with said bottom flange of said attachment which is greater than 90°.

* * * * *